United States Patent [19]
Livingston, Sr.

[11] Patent Number: 5,325,944
[45] Date of Patent: Jul. 5, 1994

[54] APPARATUS AND METHOD FOR BRAKING A VEHICLE

[76] Inventor: Robert L. Livingston, Sr., 921 1/2 St. Croix St., Hudson, Wis. 54016

[21] Appl. No.: 7,003

[22] Filed: Jan. 21, 1993

Related U.S. Application Data

[63] Continuation of Ser. No. 697,582, May 9, 1991, abandoned.

[51] Int. Cl.⁵ ............................................. F16D 57/02
[52] U.S. Cl. ..................................... 188/294; 188/292; 192/61
[58] Field of Search ............... 188/292, 293, 294, 295, 188/290, 291; 192/61; 137/599; 138/94

[56] References Cited

U.S. PATENT DOCUMENTS

| | | |
|---|---|---|
| 474,958 | 5/1892 | Hollingsworth . |
| 1,580,322 | 4/1926 | Parker .................. 188/292 |
| 1,611,112 | 12/1926 | Gates . |
| 1,655,844 | 1/1928 | Roach .................. 188/292 |
| 1,757,059 | 5/1930 | Rickenberg ............ 137/599 X |
| 1,829,554 | 10/1931 | Baker .................... 192/61 |
| 1,992,848 | 2/1935 | Wade . |
| 2,162,541 | 6/1939 | Walker . |
| 2,445,573 | 7/1948 | Godbe, Jr. ........... 188/293 X |
| 2,513,879 | 7/1950 | Kennedy . |
| 2,723,010 | 11/1955 | Stelmack ............ 188/292 X |
| 2,963,118 | 12/1960 | Booth et al. . |
| 3,185,261 | 5/1965 | Campbell et al. . |
| 4,518,011 | 5/1985 | Stoll .................. 137/599 X |
| 4,974,707 | 12/1990 | Neumann et al. ....... 137/599 X |

FOREIGN PATENT DOCUMENTS

| | | | |
|---|---|---|---|
| 221627 | 8/1957 | Australia ............................. 188/292 |
| 2362482 | 6/1975 | Fed. Rep. of Germany ...... 137/599 |

Primary Examiner—Robert J. Oberleitner
Assistant Examiner—Lee W. Young
Attorney, Agent, or Firm—Nawrocki, Rooney & Sievertson

[57] ABSTRACT

A system for effecting the braking of a vehicle. The system is intended to be used with a vehicle which has an axle coaxial with a wheel engaging the surface over which the vehicle travels and which is rotatable with that wheel. The braking system includes a closed hydraulic circuit and a pump in the circuit which has an impeller rotatable by the axle as the vehicle moves over the surface. The invention includes structure for selectively, and sequentially, increasing the restriction of flow through the hydraulic circuit so that, as flow is restricted, a back-pressure is induced in the pump to apply a drag to the axle in a measure commensurate to the amount the flow is restricted.

6 Claims, 1 Drawing Sheet

APPARATUS AND METHOD FOR BRAKING A VEHICLE

This is a file wrapper continuation of co-pending application Ser. No. 07/697,582 filed on May 9, 1991, now abandoned.

TECHNICAL FIELD

The present invention deals broadly with the field of transportation. More narrowly, however, it deals with braking systems for vehicles having wheels, rotatable about an axis defined by an axle, for conveying the vehicle of a surface. The focus of the invention is a hydraulic braking system which can sequentially increase braking action.

BACKGROUND OF THE INVENTION

Transportation of commodities over ground is effected in a number of ways. Certainly, rail is one viable alternative. It will be understood, however, that trailer trucks are a significant alternative to rail transportation. The movement of items from one location to another location at some significant distance from the initial point is an important goal to be accomplished. Commensurate with the importance of this goal, however, is that the movement be accomplished in a safe manner. Accidents occur on highway systems at an increasingly alarming rate. Certainly, it is important in attempting to minimize accidents that vehicles traveling over roads be provided with adequate braking systems.

The problem is exacerbated in the case of trailer trucks. Because of the significant weights of their cargos, unique problems are introduced. Certainly, it is not sufficient that a cab be slowed down without applying direct braking power to the trailer being towed behind. If no braking power were applied to the trailer, the trailer would be carried, by its momentum, up and over a cab which has been rapidly decelerated by braking action in response to a hazardous situation.

Various types of systems for effecting braking of the trailer component of a tandem arrangement have been developed. One system employs air brakes. In such a system, pressurized air functions to effect movement of a shoe to engage and press against the drum of a brake at a trailer's wheel. Reduction in speed, thereby, occurs.

Another system employs electro-magnetic brakes. In this type of system, movement of a shoe is effected by employment of an electro-magnet which pulls a metal plate. Engagement of a shoe with the drum again creates friction to slow the vehicle.

A number of drawbacks exist with both of these systems, however. Stopping ability will be hampered as a result of excessive heat being generated as a result of friction. Consequently, the ability to slow and stop a vehicle will be reduced.

The present invention is a method and system which ameliorate the problems of the prior art. They employ hydraulic braking which augments the conventional air brake or electro-magnetic brake system of the vehicle.

SUMMARY OF THE INVENTION

The present invention is a braking system for use on a vehicle which has an axle able to be rotated along with at least one of the vehicle's wheels which is in engagement with the surface over which the vehicle moves, and which rotates as the vehicle moves over the surface. It will be understood that the axle would be coaxial with the at least one wheel of the vehicle and could be mated to the wheel in any appropriate manner so that, as the wheel of the vehicle rotates, rotational motion could be imparted to the axle. The system includes a closed hydraulic circuit. A pump is interposed in the circuit, and the pump includes an impeller which is rotatable by the axle in response to the impartation of rotational motion to the axle by the wheel as the vehicle moves over the surface. Means are provided for selectively increasing, in sequence, the restriction of flow through the closed hydraulic circuit. As flow is restricted, therefore, a back-pressure is induced in the pump to apply a drag to the axle and, concurrently, the wheel.

In the preferred embodiment, lock-out hubs can be employed to mate one or more of the wheels of the vehicle with the axle by which the impeller is driven. It is typical that a trailer towed by a cab has wheels which are, substantially, mounted to spindles so as to allow free-wheeling independent of any axle. Employment of lock-out hubs, however, enables the mating of the axle to one or more of the wheels so that the axle will be rotated as the vehicle moves over the ground.

Also in the preferred embodiment, a series of solenoid-actuated gate valves function as the means for increasing restriction of flow through the closed hydraulic circuit. It is envisioned that the solenoid-actuated valves be two-position gate valves. Each gate valve has a retracted position, wherein flow is unimpeded, and an extended position, wherein flow is restricted in some measure through the closed hydraulic circuit. The extended position of each solenoid-actuated gate valve is different from that of each of the other gate valves so that each gate valve restricts flow through the circuit to a different degree.

In the preferred embodiment of the invention, the gate valves are arranged so that the first gate valve encountered by the flow restricts flow, when it is in its extended position, to a lesser extent than does the second gate valve, when it is in its extended position. Similarly, the second gate valve restricts flow to a lesser degree than does the next downflow gate valve.

Means can be provided to sequentially actuate the gate valves in an order from an upflowmost valve to the downflowmost gate valve. Restriction of flow is, thereby, gradually accomplished, and smooth braking will be effected.

Typically, a reservoir of hydraulic fluid can be provided in a circuit. As a result, an appropriate volume of fluid will always be available for flow through a circuit.

The invention also includes a method application. In the method, a hydraulic circuit having a pump including an impeller is provided. The impeller is disposed for rotation as an axle, matable to a wheel engaging the surface over which the vehicle travels, rotates. The method also includes a step for sequentially increasing restriction of flow through the circuit to increasingly reduce rotation of the impeller and, thereby, reduce rotation of the axle and the wheel to which the axle can be mated.

The present invention is thus an improved apparatus and method for braking a vehicle. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
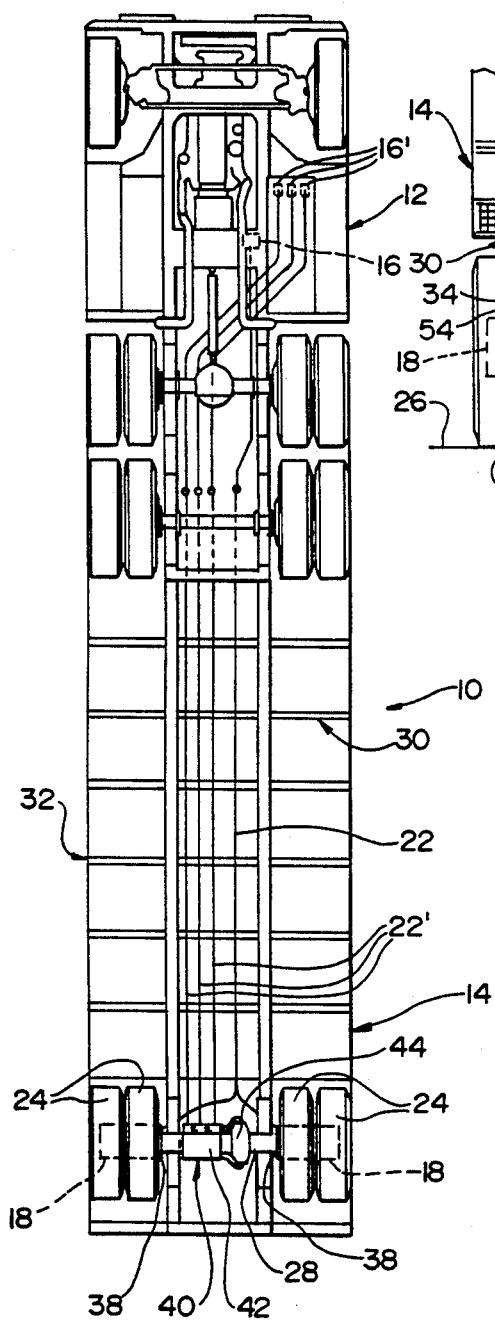
FIG. 1 is a bottom plan view of a tractor-trailer employing the present invention.

Referring now to the drawing wherein like reference numerals denote like elements throughout the several views, FIG. 1 shows the underside of a tandem tractor-trailer combination 10. The tractor 12, is shown at the upper end of the figure, while the trailer portion 14 is illustrated at the bottom end of the figure.

FIG. 1 illustrates a series of actuators 16, 16' for lock-out hubs 18 and a plurality of solenoid-actuated gate valves 20 as will be discussed hereinafter. In one embodiment, these actuators 16, 16' could take the form of dashboard-mounted switches. It will be understood, however, that any appropriate means of actuation could be employed. In fact, the braking system in accordance with the present invention, including the actuators 16, 16' for the lock-out hubs 18 and the solenoid-actuated valves 20, could be integrated into the normal braking system of the vehicle such as an air brake system. Actuation of the air brake system could function, by employment of microprocessor means (not shown), to initiate operation of the present supplemental breaking system.

FIG. 1 illustrates, schematically, some manner of control of the solenoid-actuated valves 20 and lock-out hubs 18. A plurality of leads 22, 22', corresponding to these components, extend from the tractor, or cab 12, to the rear end of the trailer 14. It will be understood, however, that any transmission means for conveying actuation signals from the tractor 12 to the various gate valves 20 and lock-out hubs 18 could be employed.

Figure 2:
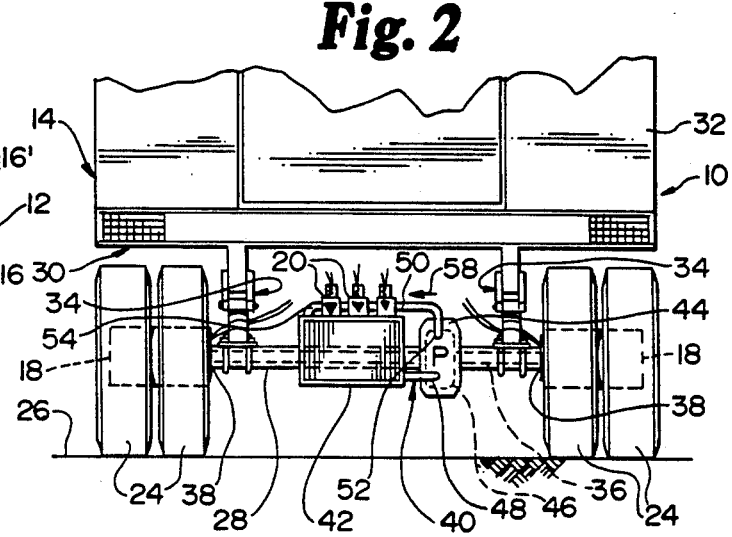
FIG. 2 is a fragmentary rear elevational view of the present invention.

Referring now to FIG. 2, a series of wheels 24 mounting the vehicle 10 for movement over ground 26 are illustrated. FIG. 2 shows two wheels 24 on either side of an interconnecting axle housing 28. The housing 28, in turn, supports the framework 30 and chassis 32 of the trailer 14, and a suspension system 34 is employed for this purpose.

Conventionally, the wheels 24 of the trailer 14 freewheel and normally operate independently of the rear axle 36. That is, the wheels 24 are mounted to spindles 38 that operate independently of the axle 36 received within the axle housing 28. Consequently, movement of the vehicle 10 over the ground 26 and related rotation of the wheels 24 will not necessarily be translated into rotational motion of the axle 36. As a result, deleterious effects will not be brought to bear upon the various mechanical components.

The lock-out hubs 18 to which reference has previously been made can be employed to mate the wheels 24 to the axle 36. When such mating is effected, rotational movement of the wheels 24 as the vehicle 10 moves over the ground will, in turn, be translated into rotation of the axle 36 which is coaxial with the wheels 24. This is necessary since the present system for braking functions to retard rotation of the axle 36, and that retardation, in turn, is transmitted to the wheels 24.

With continued reference to FIG. 2, that figure illustrates a closed hydraulic circuit 40 which is mounted proximate the axle housing 28. A reservoir 42 for hydraulic fluid is shown as encircling the axle housing 28. Such a reservoir 42 provides a quantity of hydraulic fluid to the circuit 40 sufficient to ensure proper operation. The figure illustrates the reservoir 42, as previously indicated, as encircling the axle housing 28. It will be understood, however that such a relationship is not essential to the invention, in its broadest sense. By so mounting the reservoir 42, however, economic utilization of space is achieved.

The circuit 40 also includes a pump 44 which is also illustrated as encircling the axle housing 28. The pump 44 includes an impeller 46 within the pump housing which is rigidly connected to the axle 36. As the axle 36 is made to rotate, the impeller 46 will, therefore, rotate also. The pump 44 is in fluid communication with the reservoir 42, and, as the impeller 46 of the pump 44 is made to rotate by the rotating axle 36, fluid will be drawn from the reservoir 42, through an interconnecting conduit 48, and through the pump 44. A conduit 50, which is shown as extending above the reservoir 42 in FIG. 2, places the outlet port 52 of the pump 44 in fluid communication back to the reservoir 42. The figure shows a series of gate valves 20 interposed in this conduit 50. Three valves 20 are specifically illustrated, but it will be understood that a greater or lesser number could be appropriately employed. In fact, it is specifically within the scope of the invention to employ a single, multiple-position valve having a retracted position, wherein fluid flow through the conduit 50 is unimpeded, and a plurality of extended positions, wherein fluid flow through the conduit 50 is restricted to various degrees, depending upon the degree of occlusion in view of the position of the valve closure element. When a single, multiple-position valve 20 is employed, however, greater stress is placed upon the single valve than is true in the case of each of multiple valves. Additionally with multiple valves 20, if one of the valves 20 becomes inoperative, others are available to still accomplish the braking function.

Figure 3:
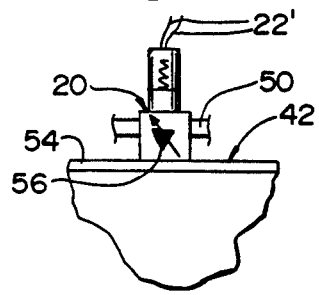
FIG. 3 is a fragmentary detail view of a solenoid-actuated gate valve utilized in the invention.

FIG. 3 illustrates a single one of the solenoid-actuated gate valves 20 as mounted on an upper wall 54 of the reservoir 42. Such mounting is not, of course, essential. Any appropriate manner of mounting of the valves 20 to effect restriction of flow through the conduit 50 can be employed.

FIG. 2 illustrates a series of three valves 20 wherein each valve has two discrete positions: a retracted position, wherein the valve element 56 does not impede flow through the conduit 50, and an extended position, wherein flow through the conduit 50 is impeded in some measure. Flow through the closed hydraulic circuit 40 is in a direction as indicated by arrow 58. FIG. 2 illustrates the gate valves 20 in their extended positions, and it can be seen that the first gate valve encountered by the flow has a position which impedes flow to a lesser degree than does the next adjacent valve downflow from the first valve. Similarly, the second valve, when its element 56 is in its extended position, impedes or restricts flow through the conduit 50 in which the valves 20 are interposed to a lesser degree than does the next downflow valve. Consequently, with sequential actuation of the elements of 56 of the valves 20 to their extended positions in a downflow order, fluid flow through the conduit 50 will be increasingly impeded or restricted.

FIG. 2 does not illustrate all components which might be employed in the fluid circuit 40. For example, an oil cooler might be utilized in order to facilitate proper functioning of the system. Additionally, an oil filter or cleaner might also be used to facilitate proper operation. While such components are not specifically illustrated in the figures, it will be understood that in an actual system on a vehicle 10, they would probably be incorporated.

Operation of the present system for braking will now be described. As previously discussed, during normal operation of the vehicle 10, the wheels 24 of the vehicle are mounted for freewheeling and are not mated to the axle 36 received within the axle housing 28. As braking becomes necessary, the operator of the vehicle 10 will initiate functioning of the normal braking system of the vehicle. As previously discussed, such a normal braking system might be an air brake assembly. If desired, the present supplemental braking system could be initiated either automatically as normal braking is implemented, or manually by the flipping of one or more switches. If automatic implementation is employed, micro-processor means would be integrated into the system to sequentially time various steps. Otherwise, a series of manual switches on the dashboard of the cab could be manipulated by the vehicle's operator.

In either manner of operation, the first step that would be initiated is the operation of the lock-out hubs 18. Operation of the lock-out hubs 18 would, in effect, accomplish mating of the wheels 24 to the axle 36. Since the wheels 24 were, previously, freewheeling and disassociated from the axle 36, the axle 36 may not even have been rotating. Upon actuation of the lock-out hubs 18, however, rotation of the wheels 24 becomes translated to rotation of the axle 36 about its axis. As the axle 36 begins to rotate, the impeller 46 of the pump 44 starts to rotate commensurately. The rotation of the impeller 46, in turn, effects a flow of hydraulic fluid from the reservoir 42, through the conduit 48, and into the pump 44, through the pump 44, and into the conduit 50 in which the solenoid-actuated gate valves 20 are interposed. Flow through this conduit 50 is ultimately dumped back into the reservoir 42.

Initiation of actuation of the lock-out hubs 18 may, automatically, initiate sequential operation of the gate valves 20. That is, implementation of the operation of the lock-out hubs 18 may also automatically initiate sequential closure of the gate valves 20 from their retracted positions to their extended positions. It will be understood, however, in view of this disclosure, that a volitional act on behalf of the operator of the vehicle 10 to initiate operation of the gate valves 20 might be required. Such a volitional act might take the form of flipping of a toggle switch, or a plurality of toggle switches, to effect movement of the gate valve elements 56 to their extended positions. In fact, in an embodiment wherein a separate toggle switch is provided for each gate valve, if more rapid braking were necessary, the operator could implement quicker flow restriction by initially actuating the second gate valve rather than the first. While this might put a greater strain upon the second gate valve, quicker deceleration of the vehicle 10 could be achieved. If the second gate valve in the system were actuated to its extended position, the operator would, probably, still close the third gate valve to effect maximum restriction or impeding of flow.

As flow through the system is impeded, the rotational movement of the pump impeller 46 will be decreased. Since the impeller 46 is rigidly attached to the axle 36, rotation of the axle 36 will, commensurately, be decreased also. With the lock-out hubs 18 actuated, the decrease in rotational motion of the axle 36 will, in turn, be translated back to the wheels 24, and braking of the vehicle 10 will be augmented by the present system.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for braking a vehicle having an axle which is coaxial with a wheel engaging the surface over which the vehicle travels and rotatable with the wheel, comprising:

(a) a closed hydraulic circuit;
   (b) a pump in said circuit, said pump having an impeller rotatable by the axle as the vehicle moves over the surface;
   (c) means for selectively increasing, in sequence, the restriction of flow through said closed hydraulic circuit, wherein, as flow is restricted, a back-pressure is induced in said pump to apply a drag to the axle, said means for increasing the restriction of flow through said closed hydraulic system including a plurality of gate valves mounted within said closed hydraulic circuit, each of said gate valves having a vale element disposed for, and limited to, movement between a first, retracted position, wherein flow through said circuit is unimpeded, and a second, extended position, wherein flow is restricted in some measure;
   (d) wherein a gate valve upflow of an adjacent gate valve, when said valve element of said upflow gate valve is in its second, extended position, restricts flow through said circuit to a lesser extent than does the adjacent downflow gate valve, when said valve element of said adjacent downflow gate valve is in its second, extended position, and wherein said valve elements of said plurality of gate valves, when actuated to effect braking of the vehicle, are moved from their defined first, retracted positions to their second, extended positions in sequence from an upflowmost gate valve to a downflowmost gate valve in said circuit such that flow through said circuit is incrementally more restricted as it passes through said gate valves.

2. Apparatus in accordance with claim 1, further comprising a reservoir of hydraulic fluid in said circuit.

3. Apparatus in accordance with claim 2 wherein said reservoir surrounds the axle.

4. Apparatus in accordance with claim 3 wherein said solenoid-actuated gate valves are interposed in said circuit between an outlet port of said pump and said reservoir.

5. Apparatus in accordance with claim 1 wherein each of said gate valves is solenoid-actuated.

6. Apparatus in accordance with claim 5 further comprising a lock-out hub mechanically interposed intermediate the wheel and the axle, wherein the wheel can be selectively disengaged from the axle by means of said lock-out hub to enable the wheel to freewheel independently of the axle irrespective of the degree of flow restriction effected in said circuit.

* * * * *